Oct. 25, 1955     R. G. LE TOURNEAU     2,721,761
CABLE OPERATED DUMP BODY

Filed Feb. 8, 1950     3 Sheets-Sheet 1

INVENTOR.
R. G. LeTourneau
BY
J. D. Copeland Jr.
AGENT

Oct. 25, 1955   R. G. LE TOURNEAU   2,721,761
CABLE OPERATED DUMP BODY
Filed Feb. 8, 1950   3 Sheets-Sheet 2

INVENTOR.
R. G. LeTOURNEAU
BY
J. D. Copeland Jr.
AGENT

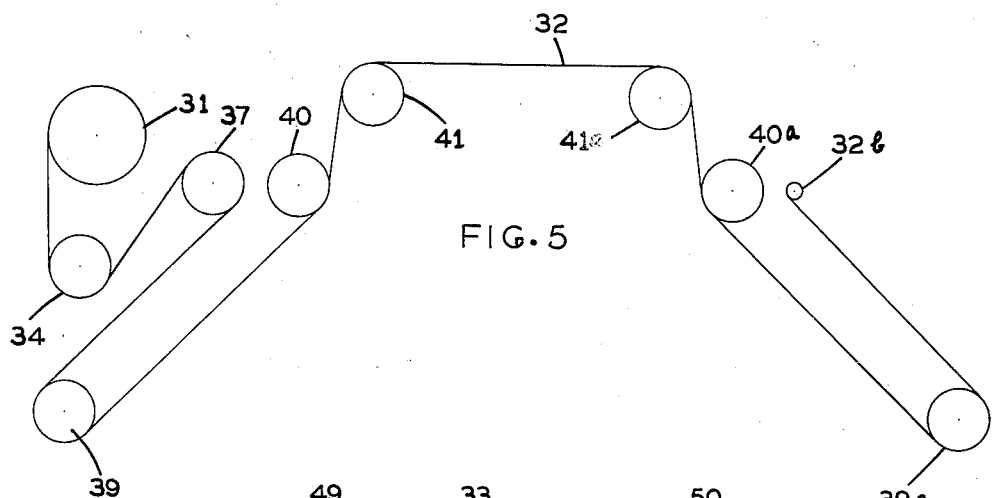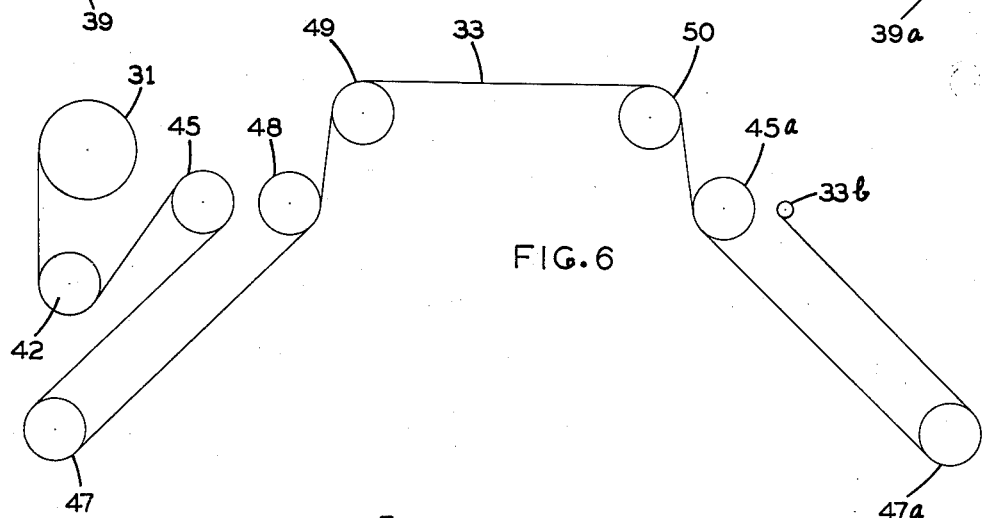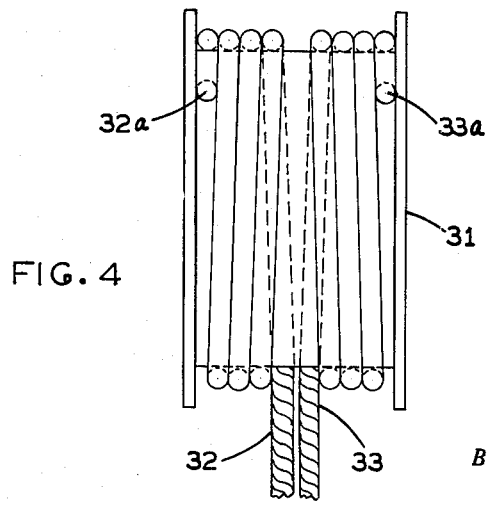

United States Patent Office 2,721,761
Patented Oct. 25, 1955

2,721,761

CABLE OPERATED DUMP BODY

Robert G. Le Tourneau, Longview, Tex., assignor to R. G. Le Tourneau, Inc., Peoria, Ill., a corporation of California Application February 8, 1950, Serial No. 143,003

15 Claims. (Cl. 298—35)

This invention relates to hauling vehicles which discharge their load through bottom opening dump gates.

The primary object of this invention is to provide a bottom dump body which includes pivoted dump gates which overlap to insure a complete closure for the load.

Another object is to provide a unique structure for the overlapping gates and the dump body which causes the gates to move away from the body when pivoting to their open position.

A further object is to provide a novel power operated cable system for opening the dump gates.

Yet another object is to provide a means for preventing the accumulation of slack in the cable system after the gates have closed.

A still further object is to provide a cable system powered by a reversible electric winch and automatic means for stopping the winch in one direction only when further rotation in that direction would put slack in the cable system.

Other objects and advantages will become apparent from a perusal of the following specification and the accompanying drawings, in which:

Fig. 4 is an enlarged plan view of the cable drum showing the two cables wound on it.

Fig. 5 is a schematic view showing the cable reeving for opening gate 11.

Fig. 6 is a schematic view showing the cable reeving for opening gate 12.

Figure 7 is a view taken generally in the direction indicated by the arrows 7—7 in Figure 2.

Figure 1:
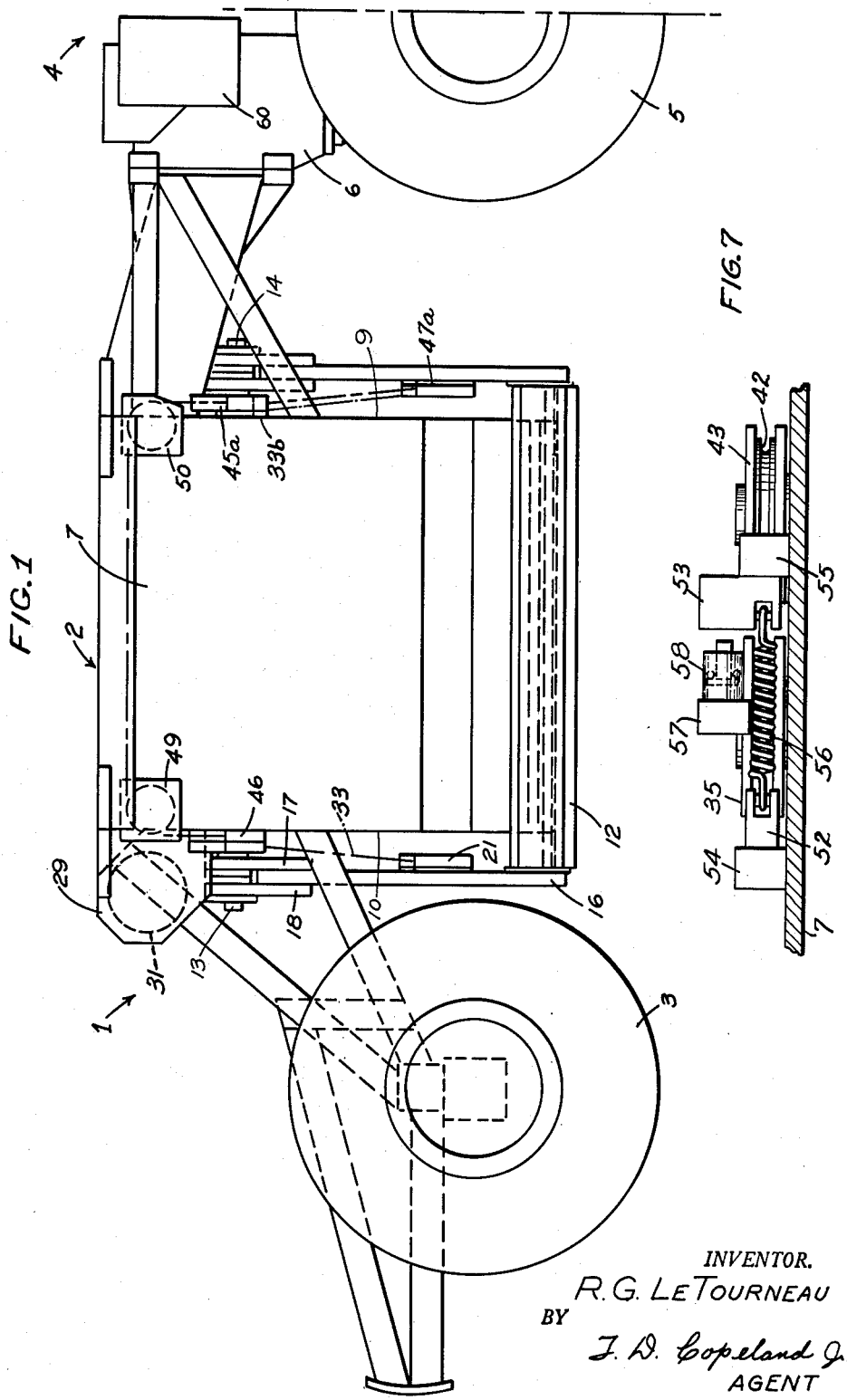
Fig. 1 is a side elevational view of the dump trailer and showing a portion of the attached two wheel tractor.
Figure 2:
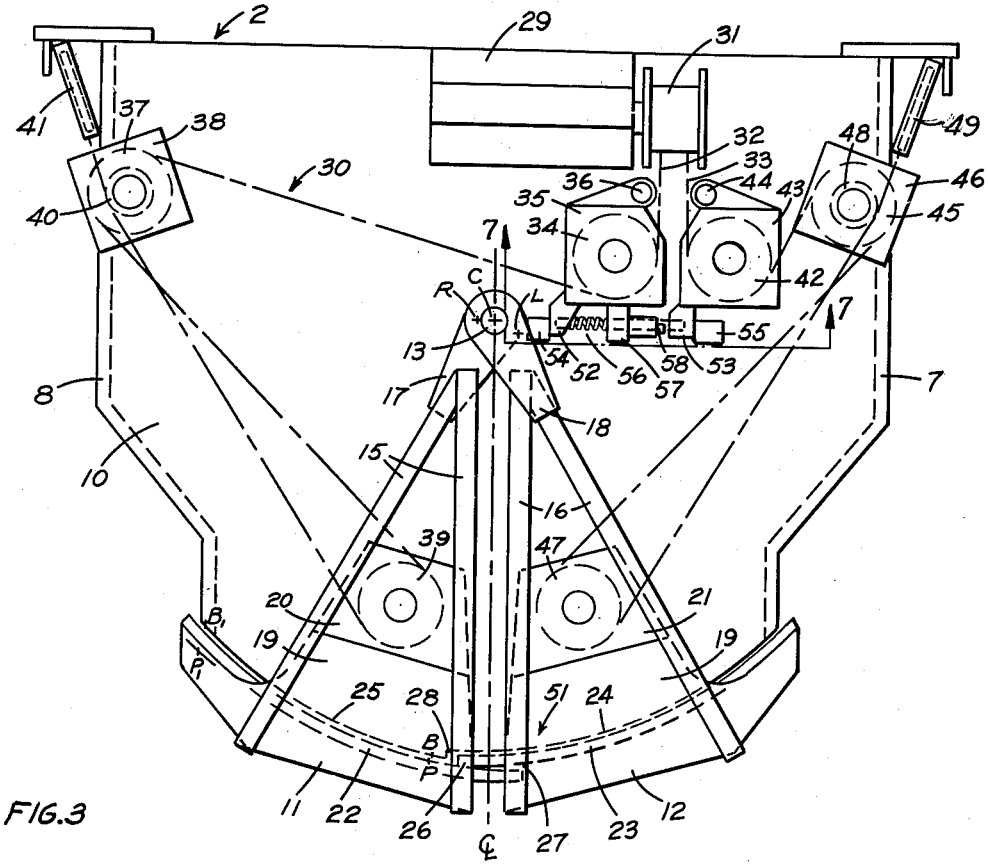
Fig. 2 is an end view of the rear end of the dump trailer with the rear wheel structure removed to show the cable arrangement and overlapping gates.

Referring now to the drawing, this bottom dump wagon is seen to consist generally of a trailer 1, including a dump body 2 supported at its rear by wheels 3, and to which a tractor 4 including drive wheels 5 is attached in steerable relation by means of steering hitch 6.

The dump body 2 includes side walls 7 and 8, and front and rear end plates 9 and 10 respectively. Bottom dump gates 11 and 12 are hinged about a common pin 13 on the rear end plate and 14 on the front end plate. These gates include vertical frame members 15 and pin 16 which attach at their upper end to eye pieces 17 and 18. Eye pieces 17 and 18 are placed on opposite sides of their corresponding frame members 15 and 16 so that they are spaced to provide clearance when pivoting about pin 13. Plates 19 are welded to frame members 15, 16 to strengthen the gate structure and to accommodate sheave housing 20 and 21.

Gates 11 and 12 contain bottom cover plates 22 and 23 which overlap on each side of the center line CL and thereby insure a complete closure for a load contained within body 2. The particular construction of these bottom plates and end plates 9 and 10 provides a unique overlapping gate mechanism in which the gates move away from the body when pivoting to an open position and thereby eliminate drag and provide clearance to free any particles of the load that might become wedged between the gates and the body. To accomplish this feature both the right bottom edge 24 of end plate 10 and the right bottom plate 23 have the same center of curvature R which is laterally offset from the center of rotation C of the gates 11 and 12; the left bottom edge 25 and plate 22 also have the same center of curvature L which is offset both laterally and downwardly from center C to permit plate 22 to overlap plate 23. By this construction, a point P on either bottom plate which is very close to a corresponding point B on the bottom edge of the body 2 will move away from the body as the gates are rotated about pivot pin 13 until at the near open position $P_1$ it will be a considerably greater distance from its nearest corresponding point $B_1$ of the body. At the position where the bottom plates overlap in their closed position they will touch at only one edge 26 and will have considerable clearance at the other edge 27 so that these plates will not drag or bind between themselves when opening. The end plates 9 and 10 are notched at 28 to permit the plates 22 and 23 to overlap and still have a uniform clearance with the bottom edges 25 and 24 when in their closed position.

When the plate 23 touches plate 22 at its edge 26, the gates 11 and 12 will be completely closed, yet power winch 29 may continue to operate and such operation will put excessive slack in cable system 30. To eliminate this accumulation of slack in the system, a novel cable reeving and sheave arrangement is employed.

Examining the rear end of the body 2 in Fig. 2, and Figs. 4, 5 and 6, the function of the cable system may be observed. Reversible electric winch 29 includes a cable drum 31 on which are wound cables 32 and 33 for operation of gates 11 and 12 respectively. Cable 32 is deadended on the drum 31 at 32a and winds for several turns about the drum thence passes under sheave 34 of sheave housing 35 which is pivoted at 36 to end plate 10. Cable 32 is then reeved over sheave 37 of housing 38 near the upper left side of plate 10 and then over and around sheave 39 of housing 20 attached to frame members 15. From sheave 39 the cable passes by direction changing sheave 40 and into a sheave housing containing sheave 41 from whence it is directed to the front end plate 9 where a similar arrangement is employed to equalize the load on cable system and effect a smooth opening of gate 11. Cable 32 goes forward to sheave 41a thence to the front plate 9 where it is threaded over direction changing sheave 40a, around sheave 39a and up to a deadend 32b fixed with respect to the front end plate 9. Cable 33 is deadended on the drum 31 at 33a and winds for several turns around the drum in the same direction as cable 32 and is reeved in a similar manner first under sheave 42 of housing 43 which is pivoted at 44 and then over sheave 45 of housing 46 and over and around sheave 47 of housing 21 and from there by sheave 48 of housing 46 and thence over sheaves 49 and 50 to the front end plate for coordinated raising of both ends of gate 12. Cable 33 passes from sheave 50 to direction changing sheave 45a on the front end plate 9, thence around sheave 47a and up to a deadend 33b fixed with respect to the front end plate 9. The sheaves 37, 39 and 45, 47 form separate block and tackle systems and since both cables are powered by the same drum 31, the raising of both gates 11 and 12 will take place simultaneously. When the gates have been raised to their maximum position, the opening 51 between side plates 7 and 8 will be exposed and the load carried by body 2 will discharge by its own weight onto the ground or thru grates designed for the purpose.

Figure 3:
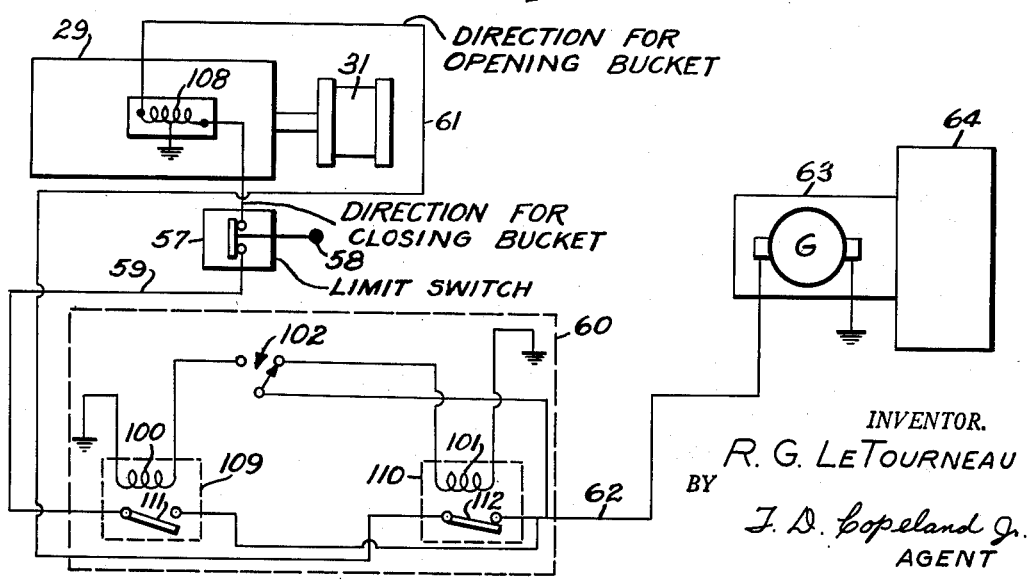
Fig. 3 is a schematic drawing showing the operation of the novel limit switch for stopping the electric winch when desired.

One novel feature of this electrically controlled cable system is the relationship between sheave housings 35 and 43. The sheaves in these housings each guide an oppositely extending cable so that whenever there is a tension on cables 32 and 33 the lugs 52 and 53 of the housings will be pulled against their respective stop blocks 54 and 55. The stop blocks 54 and 55 are mounted on the end plate 10, as shown in Figure 7. When the cable 30 is tensioned, the sheave housing 35 is pivoted about its pivot pin 36 in the clockwise direction in Figure 2 but such pivotal movement is limited by the lug 52 engaging the stop block 54. Likewise, when the other cable 33 is tensioned, the sheave housing 43 is pivoted about its pivot pin 44 in a counter-clockwise direction in Figure 2 and such pivotal movement is limited by the lug 53 on housing 43 contacting the stop block 55. Thus, when the cables 30 and 33 are tensioned, the housings 35 and 43 tend to pivot away from each other, and when there is slack in such cables 30 and 33, the housings 35 and 43 pivot toward each other about their respective pivot pins 36 and 44 under the influence of the tension spring 56. The lugs 52 and 53 are each anchored to a corresponding end of tension spring 56 which tends to pull housings 35 and 43 together. Thus, when there is slack in the cables 30 and 33, the spring 56 pivots the housing 35 in the counter-clockwise direction in Figure 2 about its pivot pin 36 and pivots the other housing 43 in a clockwise direction about the pivot pin 44. Such pivotal movement of the two housings 35 and 43, under the influence of spring 56 is limited, however, by engagement of the plunger 58 of switch 57 engaging the lug 53 on the housing 43. When the plunger 58 engages the lug 53 as described above, the switch 57 is actuated to deenergize electrical circuitry as described herein. The particular manner in which the ends of the spring 56 are anchored to the lugs 52 and 53, per se forms no part of the invention since it is obvious that different expedients may be used to accomplish this purpose. For example, the ends of the springs may be welded to the lugs 52 and 53 or the ends of the springs may be formed as hooks to engage apertured portions of the lugs 52 and 53. This spring tension is overcome during operation by the pull of cables 32 and 33. However, when the gates 11 and 12 have completely closed, there is no longer any tension on the cable, and any further paying out of cable from winch 29 will result in accumulation of slack in the cable system. To prevent this accumulation, limit switch 57 is attached to housing 35 with its plunger 58 facing lug 53 of housing 43. When slack begins to accumulate, the spring 56 then has sufficient tension to pull the housings toward each other by each pivoting about its pivot pin 36 or 44, and consequently to move lug 53 against plunger 58 with sufficient force to depress the plunger and open the switch therein. This limit switch will shut off current flowing thru lead 59 from the switch box 60 (Fig. 3) to winch 29 for operation in one direction of rotation only. Current in lead 61 to operate the winch 29 in a direction to reeve in the cable is not effected by the action of this switch, and after a short operation in this direction the spring tension will be overcome by the cable pull and the limit switch will reclose. The switch box 60 contains the necessary relays to direct current received thru lead 62 from generator 63 which is driven by tractor engine 64. In Figure 3 the switch box 60 contains relays 109 and 110. These relays 109, 110, have windings 100, 101 respectively and each has one terminal grounded while the other terminals of these windings are connected to opposite stationary contacts of the single pole double throw reversing switch 102. The movable contact of switch 102 is connected to one terminal of relay switches 112 and 111, the other terminals of such switches 112 and 111 being connected respectively to leads 61 and 59 for the aforementioned purposes.

The switch 102 is a reversing switch for purposes of controlling the direction of rotation of the winch 29. The reversible winch 29 includes the conventional split driving winding 108 with a center tap thereon grounded. Only one portion of the winding 108 is energized at a particular time, as is well understood in the art, depending upon the direction of rotation of the winch pulley. For effecting such energization of the winding 108 conventional switching means including relays 109, 110, contained in switch box 60, are provided. The movable contact of switch 102 is connected to lead 62 so that either relay winding 100 or relay winding 101 is energized when such switch 102 is in its corresponding closed position.

Operation of my cable operated dump body is controlled by throwing switch 102 to one of its two positions. When the switch 102 is thrown to the right, as shown in Fig. 3, winding 101 is energized to close the switch 112 and energize the reversible motor 29 to rotate drum 31 in a direction to raise the dump gates. When switch 102 is thrown to the left, winding 100 is energized to close the switch 111 and energize the motor 29 to rotate the drum 31 in the opposite direction to allow the dump gates to close. Normally closed limit switch 57, when actuated by plunger 58, is operative to shut off current to motor 29 when it is rotating in a direction to allow the gates to close, as described above.

Operation of the cable system, the reeving of which has been described above, depends on the direction of rotation of the cable drum 31. Upon rotation of the drum in a clockwise direction (looking from the left in Figs. 2 and 4) both cables will be reeled in. Cable 32 will raise the gate 11 by pulling up on sheave 39, fixed on the rear frame member 15, and sheave 39a which is similarly fixed to front frame member (not shown). This cable action may be seen from Fig. 5. At the same time, cable 33 is reeled in to raise gate 12 by pulling up on sheaves 47 and 47a fixed on the rear and front frame members of the gate 12. This cable action may be seen from Figs. 1, 2 and 6.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A cable operated dump body, comprising: dump gates attached to the body, a power operated cable system including a pair of cables associated with said gates for opening and closing thereof, means associated with said cable system to prevent accumulation of slack in the cable system, said means including: a pair of movable sheaves over each of which a corresponding one of said pair of cables passes, means acting to move said sheaves relative to one another upon loss of tension in said cables, and means operated in accordance with relative movement of said sheaves for disabling said system.

2. A cable operated dump body, comprising: dump gates attached to the body, an electric power operated cable system including a pair of cables associated with said gates for opening and closing thereof, means associated with said cable system to shut off the power and prevent accumulation of slack in the cable system when said gates are completely closed, said means including: a pair of movable sheaves over each of which a corresponding one of said pair of cables passes, means acting to move said sheaves relative to one another upon loss of tension in said cables, and means operated in accordance with relative movement of said sheaves for disabling said system.

3. A cable operated dump body, comprising: dump gates attached to the body, a power operated block and tackle system including a pair of cables associated with said gates for opening and closing thereof, means associated with said block and tackle system to shut off the power and prevent accumulation of slack in the block and tackle system when said gates are completely closed, said means including: a pair of movable sheaves over each of which a corresponding one of said pair of cables passes, means acting to move said sheaves relative to one another upon loss of tension in said cables, and means operated in accordance with relative movement of said sheaves for disabling said system.

4. A cable operated dump body, comprising: a pair of dump gates, a power operated cable system including a separate cable associated with each dump gate, each cable operating a separate block and tackle system, sheave housings in said block and tackle system, one pair of corresponding sheave housings in each system being closely adjacent and being relatively movable and means acting between and operated upon relative movement between said pair for shutting off the power to said cable system at a predetermined position of said gates.

5. A cable operated dump body, comprising: a pair of dump gates, a cable system including a power winch, a pair of cables contained on said winch, a block and tackle system associated with and operating each dump gate, one cable included with each block and tackle system, means common to both block and tackle systems for shutting off power to said winch when said gates are in a predetermined position of operation, said means including: a pair of movable sheaves over each of which a corresponding one of said pair of cables passes, means acting to move said sheaves relative to one another upon loss of tension in said cables, and means operated in accordance with relative movement of said sheaves for disabling said system.

6. In a cable system, a power winch controlling multiple cables of said system, a cable actuated mechanism, a pair of relatively movable sheaves arranged between said winch and mechanism over which a corresponding one of said cables passes, means operated upon relative movement between said sheaves to shut off said power winch and prevent accumulation of slack in said system upon loss of tension in at least one of said cables.

7. In a cable system, a power winch controlling multiple cables of said system, a cable actuated mechanism, relatively movable sheaves arranged between said winch and mechanism over which corresponding ones of said cables pass, means operated upon relative movement between said sheaves to shut off said power winch when the tension in said cables reaches a predetermined value.

8. A cable operated dump body, comprising: a pair of dump gates pivoted to the body about a common pivot, said gates including overlapping bottom plates enclosing a discharge opening of said body, a power actuated cable system including a pair of cables operative to open and close said gates, and means to prevent accumulation of slack in said cable system when said plates are completely overlapped, said means including a pair of movable sheaves over each of which a corresponding one of said pair of cables passes, means acting to move said sheaves relative to one another upon loss of tension in said cables, and means operated in accordance with relative movement of said sheaves for disabling said system.

9. A dump body comprising: a pair of side walls, a pair of end plates connecting said side walls to form a body with a top and bottom opening, a pair of dump gates pivoted to each end plate about a common horizontal axis, said end plates including a two segment curved bottom edge, said dump gates including a curved cover plate corresponding to each segment of said bottom edge, the center of curvature of each segment and corresponding cover plate being offset from the center about which said gates pivot to permit said cover plate to move away from said bottom segment when said gates are opening and said offset distance being different for each dump gate to permit said dump gates to overlap.

10. A cable operated mechanism comprising: a cable system including two separate cables, sheaves associated with each cable, certain sheaves being pivoted for slight rotation when there is no tension in the cables, a spring tending to rotate said certain sheaves toward one another about their pivots when there is no tension in the cables, limit means associated with one sheave, and means on the other sheave to operate said limit means for disabling said system when said certain sheaves have pivoted toward each other a predetermined amount.

11. A cable operated mechanism comprising: a cable system including two separate cables, sheaves associated with each cable, an electrical winch simultaneously controlling the operation of each cable, certain sheaves being pivoted for slight rotation when there is tension in the cables, a spring tending to rotate said certain sheaves toward one another about their pivots when there is no tension in the cables, and a limit switch associated with one sheave and means on the other sheave to operate said limit switch and interrupt current to said winch when said certain sheaves have moved toward each other a predetermined amount.

12. A dump body comprising spaced end plates forming a discharge opening and oppositely swinging gates journalled at a common pivot in each end plate about a common horizontal axis, said gates overlapping the end plates and cooperating to close the opening, each gate and the cooperating portion of each end plate being curved and having a common center of curvature, each center of curvature being offset from said pivot in a direction to cause the gates to gradually increase the distance between the gates and the cooperating portions of the end plates as the gates open with one of said gates having a center of curvature which is offset both horizontally and vertically from said horizontal axis.

13. A dump body as set forth in claim 12, each said center being laterally offset from the pivot in the direction toward which its gate swings to open.

14. A dump body, comprising: a discharge opening, a pivot pin attached to said body at each end thereof, dump gates pivoted at each end to the pin about a horizontal axis and operative to open and close said discharge opening, said dump gates including curved cover plates, and the center of curvature of said plates being offset from the center of the pivot pin in both a horizontal and vertical direction to cause the plates to move away from the body when opening.

15. A dump body comprising: a pair of side walls, a pair of end plates connecting said side walls to form a body with a top and bottom opening, a pair of dump gates pivoted to each end plate about a common pin thereon having its axis extending generally horizontally, said end plates including a two segment curved bottom edge, said dump gates including a curved cover plate corresponding to each segment of said bottom edge, and the center of curvature of one pair of segments and corresponding cover plate being offset a different distance than a second pair both horizontally and vertically from the center about which said gates pivot to permit said plates to overlap when closing.

References Cited in the file of this patent

UNITED STATES PATENTS

| | | |
|---|---|---|
| 804,221 | Hains | Nov. 14, 1904 |
| 946,547 | Hunt | Jan. 18, 1910 |
| 954,293 | Hunt et al. | Apr. 5, 1910 |
| 954,294 | Hunt | Apr. 5, 1910 |

(Other references on following page)

UNITED STATES PATENTS

| | | |
|---|---|---|
| 1,007,343 | Abbott | Feb. 17, 1914 |
| 1,087,343 | Abbott | Feb. 17, 1914 |
| 1,416,033 | Johnston | May 16, 1922 |
| 1,534,297 | Carey | Apr. 21, 1925 |
| 1,608,962 | Seron | Nov. 30, 1926 |
| 1,861,994 | Wickerham | June 7, 1932 |
| 2,069,739 | Fildes et al. | Feb. 9, 1937 |
| 2,108,864 | Kuchar | Feb. 22, 1938 |
| 2,165,507 | Rasmussen | July 11, 1939 |
| 2,237,299 | Benbow et al. | Apr. 8, 1941 |
| 2,254,285 | Harris et al. | Sept. 2, 1941 |
| 2,316,412 | French | Apr. 13, 1943 |
| 2,401,407 | Benbow et al. | June 4, 1946 |